US008395603B2

(12) United States Patent
Myung et al.

(10) Patent No.: US 8,395,603 B2
(45) Date of Patent: Mar. 12, 2013

(54) ELECTRONIC DEVICE INCLUDING DISPLAY DEVICE AND DRIVING METHOD THEREOF

(75) Inventors: Jae-Hoon Myung, Seoul (KR); Young-Joo Park, Hwaseong-si (KR); Joon-Hyun Kim, Seoul (KR); Sang-Min Lim, Yongin-si (KR)

(73) Assignee: Samsung Display Co., Ltd, Yongin-Gyeonggi-Do (KR)

( * ) Notice: Subject to any disclaimer, the term of this patent is extended or adjusted under 35 U.S.C. 154(b) by 745 days.

(21) Appl. No.: 12/565,217

(22) Filed: Sep. 23, 2009

(65) Prior Publication Data

US 2010/0079418 A1 Apr. 1, 2010

Related U.S. Application Data

(63) Continuation-in-part of application No. 11/972,806, filed on Jan. 11, 2008, now Pat. No. 8,125,476.

(30) Foreign Application Priority Data

Jan. 26, 2007 (KR) ........................ 10-2007-0008265

(51) Int. Cl.
*G06F 3/038* (2006.01)

(52) U.S. Cl. ........................................ 345/204

(58) Field of Classification Search .............. 345/81–90, 345/98–104, 204–207
See application file for complete search history.

(56) References Cited

U.S. PATENT DOCUMENTS

| | | | | |
|---|---|---|---|---|
| 6,741,239 | B2 | 5/2004 | Iwasaki | |
| 7,224,332 | B2 | 5/2007 | Cok | |
| 2004/0032382 | A1* | 2/2004 | Cok et al. | 345/82 |
| 2005/0259091 | A1 | 11/2005 | Sakamoto | |
| 2005/0280450 | A1* | 12/2005 | Shin et al. | 327/143 |
| 2006/0007206 | A1 | 1/2006 | Reddy et al. | |
| 2006/0071926 | A1 | 4/2006 | Lee et al. | |
| 2007/0001990 | A1* | 1/2007 | Lee et al. | 345/100 |
| 2007/0035538 | A1 | 2/2007 | Garcia et al. | |
| 2007/0052695 | A1* | 3/2007 | Barnes et al. | 345/204 |
| 2007/0126686 | A1* | 6/2007 | Chang et al. | 345/98 |
| 2007/0242005 | A1 | 10/2007 | Hu | |
| 2007/0262942 | A1* | 11/2007 | Choi | 345/98 |
| 2008/0122823 | A1 | 5/2008 | Kim et al. | |

FOREIGN PATENT DOCUMENTS

| | | | |
|---|---|---|---|
| CN | 1487493 | A | 4/2004 |
| CN | 1856818 | A | 11/2006 |
| JP | 05-109291 | | 4/1993 |
| JP | 11-296134 | | 10/1999 |
| JP | 2003-036065 | | 7/2003 |
| JP | 2003-185992 | | 7/2003 |

(Continued)

OTHER PUBLICATIONS

Office Action dated Apr. 28, 2011 for U.S. Appl. No. 11/972,806.

*Primary Examiner* — Chanh Nguyen
*Assistant Examiner* — Pegeman Karimi
(74) *Attorney, Agent, or Firm* — F. Chau & Associates, LLC

(57) ABSTRACT

An electronic device including a display device, and a driving method thereof, in which the display device includes a central processing unit, a display device, and a feedback unit. The central processing unit provides image signals and input control signals, and the display device displays an image based on the image signals and the input control signals. The feedback unit is connected between the central processing unit and the display device and transmits a signal, including information on whether static electricity is applied to the display device, to the central processing unit. The central processing unit initializes a driving condition when the static electricity is applied to the display device and a display operation error occurs.

18 Claims, 8 Drawing Sheets

FOREIGN PATENT DOCUMENTS

| | | | |
|---|---|---|---|
| JP | 2004-294532 | | 10/2004 |
| JP | 2004-309929 | | 11/2004 |
| JP | 2005-173143 | | 6/2005 |
| JP | 2006189714 | | 7/2006 |
| KR | 1020010091078 | A | 10/2001 |
| KR | 1020040048573 | A | 6/2004 |
| KR | 1020050008879 | A | 1/2005 |
| KR | 1020050104929 | A | 11/2005 |
| KR | 1020060072316 | A | 6/2006 |
| KR | 1020060103652 | A | 10/2006 |

* cited by examiner

ELECTRONIC DEVICE INCLUDING DISPLAY DEVICE AND DRIVING METHOD THEREOF

CROSS-REFERENCE TO RELATED APPLICATIONS

This application is a continuation in part of U.S. application Ser. No. 11/972,806 filed Jan. 11, 2008 now U.S. Pat. No. 8,125,476, which claims priority to and the benefit of Korean Patent Application No. 10-2007-0008265 filed in the Korean Intellectual Property Office on Jan. 26, 2007, the entire contents of which are incorporated herein by reference.

BACKGROUND (a) Technical Field

The present disclosure relates to an electronic device including a display device and a driver thereof.

(b) Discussion of Related Art

In recent years, as a substitute for large and heavy cathode ray tubes (CRTs), flat panel displays, such as organic light emitting diode (OLED) displays, plasma display panels (PDPs), and liquid crystal displays (LCDs) have been actively developed.

The PDPs display text or images using plasma generated by gas discharge. The organic light emitting diode displays display text or images using field emission of specific organic materials or polymers. In the liquid crystal display, an electric field is generated in a liquid crystal layer interposed between two display panels. The intensity of the electric field is adjusted to control transmittance of light that passes through the liquid crystal layer, thereby obtaining a desired image.

The flat display devices, such as a liquid crystal display or an organic light emitting diode display, include a display panel including pixels having switching elements and display signal lines, a gate driver that supplies gate signals to gate lines among the display signal lines so as to turn on/off the switching elements of the pixels, a gray voltage generator for generating a plurality of gray voltages, a data driver for selecting a voltage corresponding to image signals from the gray voltages as a data voltage and applying the data voltage to a data line among the display signal lines, and a signal controller for controlling the above elements.

In addition, electronic devices such as a mobile phone, a portable multimedia player (PMP), and a navigation device include the display device to display an operational state and an end result of the electronic device. The electronic device usually includes a microprocessor unit (MPU) corresponding to a central processing unit, and the display device also includes a driving chip for receiving image signals and control signals from the MPU to drive the display panel.

When static electricity is externally applied to the display device, an error can occur when the display device is driven, and a screen display error may be generated. Such a screen display error is acknowledged as a blackening effect in which no image is displayed on the screen. The blackening effect is generated because a voltage boosting is not appropriately performed in the driving chip of the display device, and a driving voltage is not appropriately generated. The above problem is referred to as electrostatic damage (ESD).

SUMMARY OF THE INVENTION

Exemplary embodiments of the present invention have been made in an effort to provide an electronic device including a display device for maintaining a normal display state of the display device even when static electricity is applied to the display device so as to not manifest static electricity damage.

An electronic device according to an exemplary embodiment of the present invention includes: a central processing unit (CPU) for providing image data and an input control signal; a display device for generating a driving signal and displaying an image based on the image data and the input control signal; a connecting wire for transmitting the image data and the input control signal from the CPU to the display device; and a feedback unit connected between the CPU and the display device and feeding the driving signal of the display device back to the CPU, wherein the display device is reset based on an output of the feedback unit.

The feedback unit is connected to the display device and the CPU though a wire other than the image data connecting wire.

The feedback unit is connected to the display device and a plurality of input wires, and the same is connected to the CPU through an output wire.

The feedback unit includes a transistor and two resistors for the input wiring, and the two resistors are coupled in parallel to a control terminal of the transistor.

Respective transistors included in the feedback unit are arranged so that an output terminal of one side and an input terminal of one side may be connected between a reference voltage and a ground terminal.

The output wire is connected between the reference voltage and an input terminal of the adjacent transistor.

The electronic device further includes a resistor connected between the reference voltage and an input terminal of the adjacent transistor.

The transistor is an n-type transistor.

The feedback unit outputs a low voltage when the driving signal is normal, and the feedback unit outputs a high voltage when at least one of the driving signals is not normal.

The feedback unit is a NAND circuit.

The driving signal fed back through the at least two input wires includes at least one of a gate-on voltage VGH and a reference voltage GVDD of a gray voltage.

The input control signal transmitted to the display device from the CPU through the connecting wire includes a reset signal.

A method for driving an electronic device including a central processing unit (CPU) for providing image data and an input control signal and a display device for displaying an image based on the image data and the input control signal according to an exemplary embodiment of the present invention includes: receiving a driving signal of the display device and determining whether the driving signal of the display device has a normal level; controlling the display device to perform a normal display operation when the driving signal has a normal level; controlling the CPU to reset the display device when the driving signal does not have a normal level; and performing the display operation when resetting a drive condition of the display device.

In the receiving of a driving signal of the display device and determining whether a driving signal of the display device has a normal level, there are a plurality of the determined driving signals.

The determined driving signal includes at least one of a gate-on voltage VGH and a reference voltage GVDD of a gray voltage.

In the receiving of a driving signal of the display device and determining whether a driving signal of the display device has a normal level, the driving signal of the display device is input to a feedback unit and the normal level is determined based on an output of the feedback unit.

When the feedback unit outputs a low voltage, the driving signal is determined to be a normal level, and when the feedback unit outputs a high voltage, the driving signal is determined not to be a normal level.

DETAILED DESCRIPTION OF EXEMPLARY EMBODIMENTS

Figure 1:
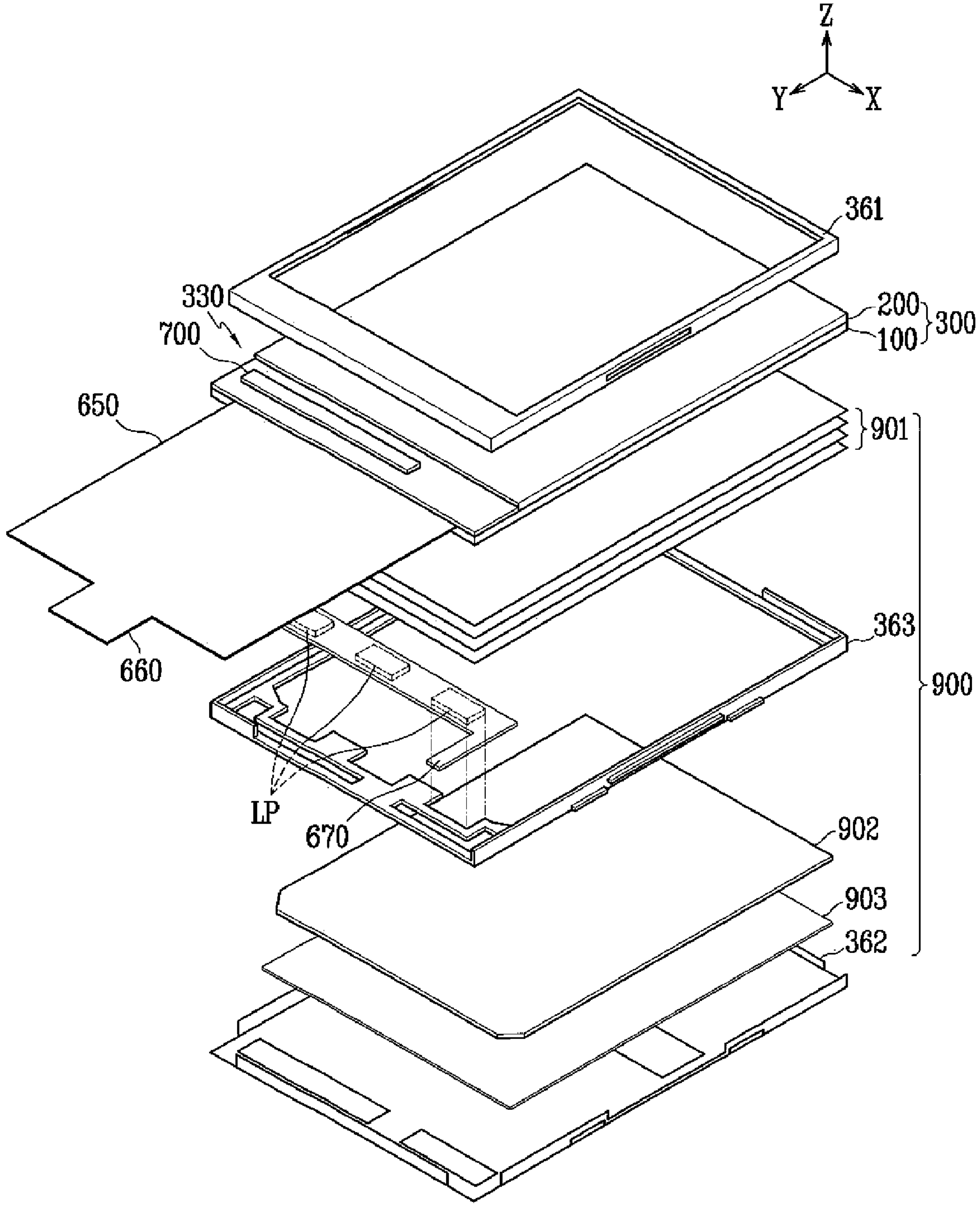
FIG. 1 is an exploded perspective view of the liquid crystal display according to an exemplary embodiment of the present invention.

The present invention will be described more fully hereinafter with reference to the accompanying drawings, in which exemplary embodiments of the invention are shown. As those of ordinary skill in the art would realize, the described exemplary embodiments may be modified in various different ways, all without departing from the spirit or scope of the present invention.

In the drawings, the thickness of layers, films, panels, regions, and the like, may be exaggerated for clarity. Like reference numerals designate like elements throughout the specification.

A liquid crystal display according to an exemplary embodiment of the present invention will now be described with reference to the figures.

Figure 2:
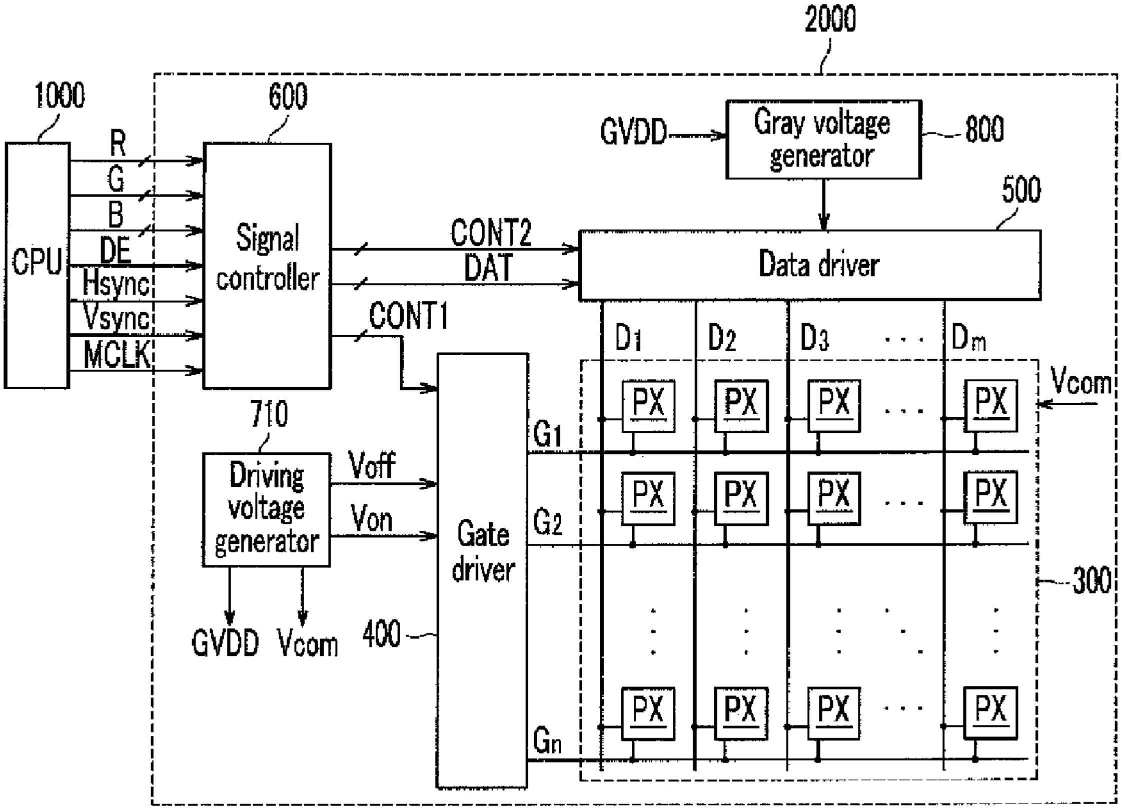
FIG. 2 is a block diagram of an electronic device according to an exemplary embodiment of the present invention.
Figure 3:
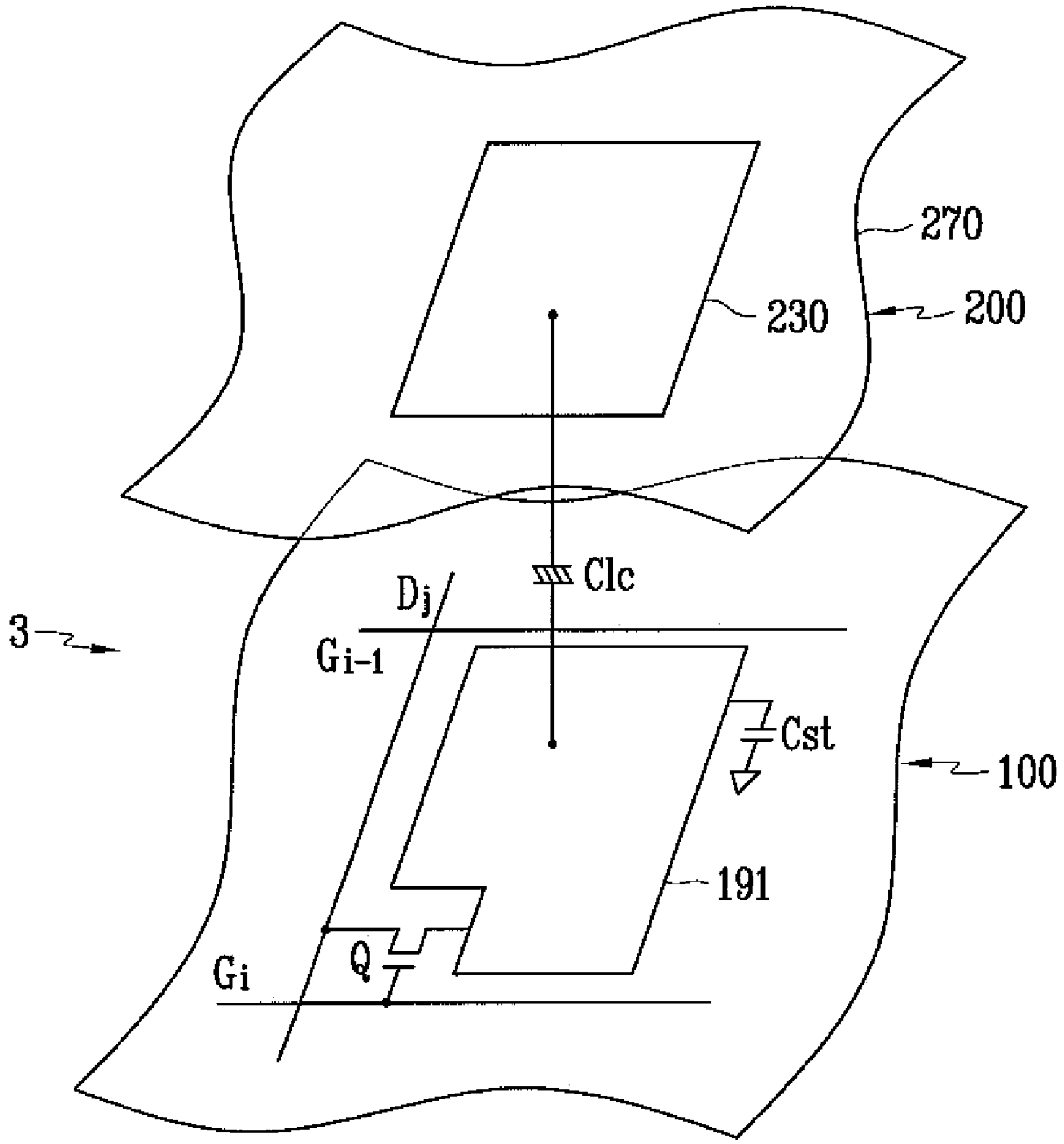
FIG. 3 is an equivalent circuit diagram of one pixel of the liquid crystal display according to an exemplary embodiment of the present invention.

FIG. 1 is an exploded perspective view of the liquid crystal display according to an exemplary embodiment of the present invention, FIG. 2 is a block diagram of an electronic device according to an exemplary embodiment of the present invention, and FIG. 3 is an equivalent circuit diagram of one pixel of the liquid crystal display according to an exemplary embodiment of the present invention.

Referring to FIG. 2, the electronic device according to an exemplary embodiment of the present invention includes a central processing unit 1000 and a display device 2000 connected to the central processing unit 1000.

The central processing unit 1000 controls an operation of the electronic device, and provides input image signals R, G, and B and control signals to the display device 2000. If the electronic device according to an exemplary embodiment of the present invention is a small or midsize device, such as a mobile phone, the central processing unit 1000 may actually be a microprocessor unit (MPU), and if the electronic device according to an exemplary embodiment of the present invention is a computer, the central processing unit 1000 may be a central processing unit (CPU).

Referring to FIG. 1, the display device 2000 of FIG. 2 of the electronic device according to an exemplary embodiment of the present invention includes a liquid crystal module including a display panel unit 330 and a back light unit 900, upper and lower chassis 361 and 362, respectively, storing the liquid crystal module, and a molded frame 363.

The display panel unit 330 includes a liquid crystal panel assembly 300, a driving chip 700 attached to the liquid crystal panel assembly 300, and a flexible printed circuit board 650.

As shown in FIG. 2 and FIG. 3, in an equivalent circuit of the liquid crystal panel assembly 300, the liquid crystal panel assembly 300 includes a plurality of signal lines and a plurality of pixels PX. In a configuration shown in FIG. 3, the liquid crystal panel assembly 300 includes lower and upper panels 100 and 200 and a liquid crystal layer 3 provided therebetween.

The signal lines are provided to the lower panel 100, and include a plurality of gate lines $G_1$ to $G_n$ for transmitting a gate signal, referred to herein as a "scanning signal", and a plurality of data lines $D_1$ to $D_m$ for transmitting a data voltage. The gate lines $G_1$ to $G_n$ are arranged in parallel and extend in a row direction, and the data lines $D_1$ to $D_m$ are arranged in parallel and extend in a column direction.

The pixels PX are arranged in a matrix format. Each of the pixels PX, for example, a pixel PX connected to an $i^{th}$ gate line Gi (here, i=1, 2, . . . , n) and a $j^{th}$ data line Dj (here, j=1, 2, . . . , m), includes a switching element Q connected to the signal lines $G_i$ and $D_j$, a liquid crystal capacitor Clc connected to the switching element Q, and a storage capacitor Cst. The storage capacitor Cst may be omitted if desired.

The switching element Q as a three terminal element including a thin film transistor is provided to the lower panel 100, a control terminal thereof is connected to the gate line Gi, an input terminal thereof is connected to the data line Dj, and an output terminal is connected to the liquid crystal capacitor Clc and the storage capacitor Cst.

The liquid crystal capacitor Clc includes a pixel electrode 191 of the lower panel 100 and a common electrode 270 of the upper panel 200 as the terminals of the liquid crystal capacitor Clc, and the liquid crystal layer 3 between the two electrodes 191 and 270 functions as a dielectric material. The pixel electrode 191 is connected to the switching element Q, and the common electrode 270 is formed in the upper panel 200 and receives a common voltage Vcom. Unlike what is shown in FIG. 3, the common electrode 270 may be provided to the lower panel 100. In this case, at least one of the two electrodes 191 and 270 may be formed in a line or bar shape.

An additional signal line (not shown) provided to the lower panel 100 and the pixel electrode 191 are overlapped while providing an insulator therebetween to form the storage capacitor Cst that acts as a subsidiary capacitor of the liquid crystal capacitor Clc, and the additional signal line receives predetermined voltages such as the common voltage Vcom. Additionally, the pixel electrode 191 and a previous gate line $G_{i-1}$ are overlapped while providing the insulator therebetween to form the storage capacitor Cst.

In order to perform a color display, each pixel PX specifically displays one of the primary colors (spatial division), or alternatively the pixels PX display the primary colors over time (temporal division), which causes the primary colors to be spatially or temporally synthesized, thereby displaying a desired color. The primary colors may include red, green, and blue. As an example of the spatial division, FIG. 3 shows that each pixel PX has a color filter 230 for displaying one of the primary colors in a region of the upper display panel 200 corresponding to the pixel electrode 191. Unlike the structure shown in FIG. 3, the color filter 230 may be provided above or below the pixel electrode 191 of the lower display panel 100.

At least one polarizer (not shown) for polarizing light is mounted on an outer surface of the liquid crystal panel assembly 300.

Referring back to FIG. 1 and FIG. 2, the driving chip 700 includes a driving voltage generator 710, a gray voltage generator 800, a gate driver 400, a data driver 500, and a signal controller 600.

The driving voltage generator 710 receives a basic voltage (not shown) and boosts the basic voltage to generate a first voltage GVDD, a second voltage VGH, and a third voltage VGL for driving the display device, and it generates first and second common voltages VcomH and VcomL (not shown) based on the first, second, and third voltages GVDD, VGH, and VGL.

In this exemplary embodiment, various driving voltages are generated based on the first voltage GVDD, and the first voltage GVDD is input to the gray voltage generator 800 as a reference gray voltage.

The second and third voltages VGH and VGL are respectively a gate-on voltage Von for turning on the switching element Q and a gate-off voltage Voff for turning off the switching element Q, which form a gate signal.

The first and second common voltages VcomH and VcomL (not shown) are respectively a maximum value and a minimum value of the common voltage Vcom that is a periodic signal.

The gray voltage generator 800 generates all gray voltages relating to transmittance of the pixel PX or a limited number of gray voltages, hereinafter referred to as "reference gray voltages," based on the reference voltage GVDD received from the driving voltage generator 710. The reference gray voltages may include the common voltage Vcom having a positive value and a negative value.

The gate driver 400 is coupled to the gate lines $G_1$ to $G_n$ of the liquid crystal panel assembly 300, receives the gate-on voltage Von and the gate-off voltage Voff from the driving voltage generator 710, combines the gate-on voltage Von and the gate-off voltage Voff to generate the gate signal, and applies the gate signal to the gate lines $G_1$ and $G_n$.

The data driver 500 is coupled to the data lines $D_1$ to $D_m$ of the liquid crystal panel assembly 300, selects the gray voltage received from the gray voltage generator 800, and applies it as a data voltage to the data lines $D_1$ to $D_m$. When the gray voltage generator 800 does not provide all the gray voltages but provides only a limited number of reference gray voltages, the data driver 500 divides a reference gray voltage and selects a desired data voltage therefrom.

The signal controller 600 controls the gate driver 400 and the data driver 500.

At least one of the drivers 400, 500, 710, 800, and the controller 600 or at least one circuit forming the drivers 400, 500, 710, 800, and the controller 600 may be formed outside an integrated chip. In addition, the respective drivers 400, 500, 710, 800, and the controller 600 may be directly mounted on the liquid crystal panel assembly 300 as at least one integrated circuit chip, they may be mounted on a flexible printed circuit film (not shown) to be attached to the liquid crystal panel assembly 300 as a type of tape carrier package (TCP), or they may be mounted on an additional flexible printed circuit board (not shown). Otherwise, the drivers 400, 500, 710, 800, and the controller 600 may be integrated with the liquid crystal panel assembly 300 along with the signal lines $G_1$ to $G_n$ and $D_1$ to $D_m$ and the thin film transistor switching element Q.

Referring back to FIG. 1, the flexible printed circuit board 650 is mounted on one side of the liquid crystal panel assembly 300. The flexible printed circuit board 650 includes a protruding portion 660 positioned on a side opposite the liquid crystal panel assembly 300. The protruding portion 660 receives various signals from the central processing unit 1000, and transmits them to the driving chip 700 through the flexible printed circuit board 650.

The flexible printed circuit board 650 includes a passive element unit (not shown). The passive element unit is connected to the driving voltage generator 710 of the driving chip 700 through a voltage line. The passive element unit includes a plurality of passive elements, such as a capacitor, an inductor, and a resistor, that are required to generate the driving voltage in the driving voltage generator 710.

The molded frame 363 is positioned between the upper chassis 361 and the lower chassis 362.

The backlight unit 900 includes one or more lamps (LP), a circuit element (not shown) for controlling the lamps, a printed circuit board 670, a light guide plate 902, a reflecting sheet 903, and a plurality of optical sheets 901.

The lamps LP are fixed to the printed circuit board 670 positioned on an edge area of a side of the molded frame 363, and supply light to the liquid crystal panel assembly 300.

The light guide plate 902 guides the light from the lamps LP toward the liquid crystal panel assembly 300, and causes the strength of the light to be uniform.

The reflecting sheet 903 is provided under the light guide plate 902, and reflects the light from the lamps LP to the liquid crystal panel assembly 300.

The optical sheet 901 is provided above the light guide plate 902, and secures luminescence characteristics of the light from the lamps LP.

The upper chassis 361 and the lower chassis 362 are combined with the molded frame 363 therebetween to comprise the liquid crystal module.

An operation of the electronic device will now be described in detail.

The central processing unit 1000 provides the input image signals R, G, and B and the input control signals to the signal controller 600.

The input image signals R, G, and B include luminance information of each pixel PX, and the luminance has a predetermined number of grays, for example, 1024 ($=2^{10}$), 256 ($=2^8$), or 64 ($=2^6$).

The input control signals may include a vertical synchronization signal Vsync, a horizontal synchronization signal Hsync, a main clock signal MCLK, and a data enable signal DE.

The signal controller 600 appropriately processes the input image signals R, G, and B according to an operational condition of the liquid crystal panel assembly 300 based on the input video signals R, G, and B and the input control signals, generates gate control signals CONT1 and data control signals CONT2, transmits the gate control signals CONT1 to the gate driver 400, and transmits the data control signals CONT2 and a processed video signal DAT to the data driver 500.

The gate control signals CONT1 include a scanning start signal for starting a scanning operation, and at least one clock signal for controlling an output period of a gate-on voltage Von. Additionally, the gate control signals CONT1 may include an output enable signal for limiting a duration time of the gate-on voltage Von.

The data control signals CONT2 include a horizontal synchronizing start signal for informing transmission start of the digital video signal DAT for a pixel PX of one row, and a load signal and a data clock signal for applying an analog data voltage to the data lines $D_1$ to $D_m$. Further, the data control signals CONT2 may include an inversion signal for inverting data voltage polarity with respect to the common voltage Vcom, hereinafter, the data voltage polarity with respect to the common voltage Vcom will be referred to as "data voltage polarity."

According to the data control signals CONT2 from the signal controller 600, the data driver 500 receives the digital video signal DAT for a pixel PX of one row, selects a gray voltage corresponding to each digital video signal DAT, and converts the digital video signal DAT to an analog data voltage and applies it to the corresponding data lines $D_1$ to $D_m$.

The gate driver 400 applies the gate-on voltage Von to the gate lines $G_1$ to $G_n$ according to the gate control signals CONT1 from the signal controller 600 to turn on the switching element Q coupled to the gate lines $G_1$ to G. Thereby, the data voltage applied to the data lines $D_1$ to $D_m$ is applied to the corresponding pixel PX through the turned on switching element Q, shown in FIG. 3.

A difference between the data voltage applied to the pixel PX and the common voltage Vcom is expressed as a charged voltage of the liquid crystal capacitor Clc, that is, a pixel voltage. The liquid crystal molecules in the liquid crystal capacitor Clc have orientations depending on the magnitude of the pixel voltage, and the molecular orientations determine the polarization of light passing through the liquid crystal layer 3.

The polarizer(s) converts the light polarization into light transmittance such that the pixel PX has a luminance represented by a gray of the data voltage.

The above operation is repeatedly performed having a horizontal period (1H) corresponding to one period of the horizontal synchronization signal Hsync and the data enable signal DE, the gate-on voltage Von is sequentially applied to all the gate lines G1 to Gn, and the data voltage is applied to all the pixels so as to display an image of one frame.

When the next frame starts after one frame finishes, a state of the inversion signal applied to the data driver 500 to invert the polarity of the data voltage applied to each pixel PX from the polarity of a previous frame is controlled, which is referred to as "frame inversion". In this exemplary embodiment, in one frame, the polarity of the data voltage flowing through one data line may be periodically changed according to characteristics of the inversion signal, for example, row inversion and dot inversion, or the polarities of the data voltage applied to one pixel row may be different, for example, column inversion and dot inversion.

The electronic device according to an exemplary embodiment of the present invention will now be described with reference to FIG. 4 and FIG. 5.

Figure 4:
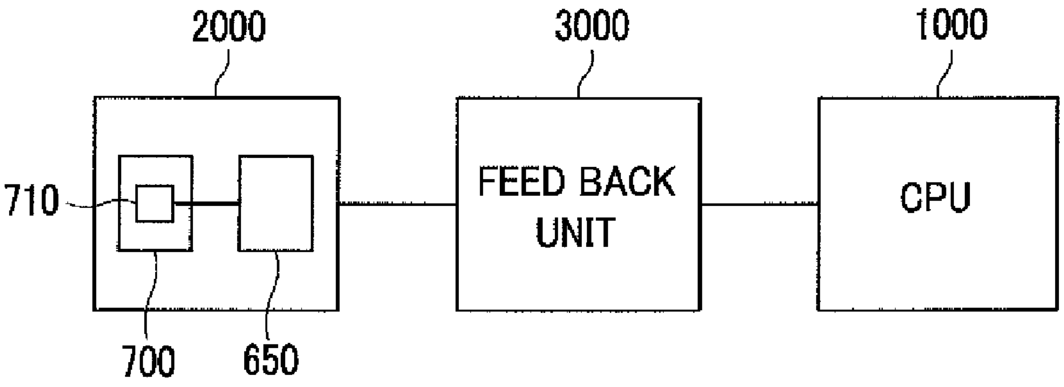
FIG. 4 is a block diagram representing a part of the electronic device according to an exemplary embodiment of the present invention.
Figure 5:
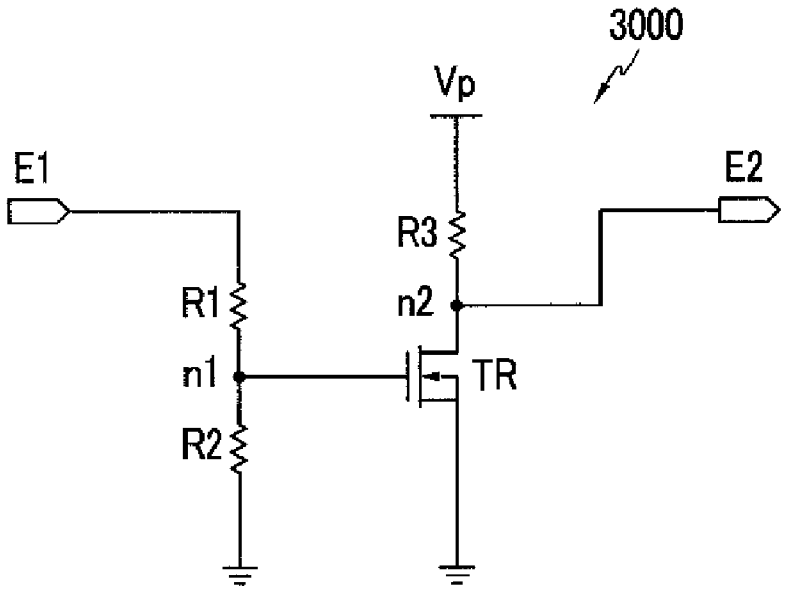
FIG. 5 is a circuit diagram representing a feedback unit in the electronic device shown in FIG. 4.

FIG. 4 is a block diagram representing a part of the electronic device according to an exemplary embodiment of the present invention, and FIG. 5 is a circuit diagram representing a feedback unit in the electronic device shown in FIG. 4.

Referring to FIG. 4, the electronic device according to an exemplary embodiment of the present invention includes the central processing unit 1000, the display device 2000, and a feedback unit 3000 connected between the central processing unit 1000 and the display device 2000.

The feedback unit 3000 transmits a signal, which includes information on whether static electricity is applied to the display device 2000, to the central processing unit 1000. Then, the central processing unit 1000 drives the display device 2000 based on the signal transmitted from the feedback unit 3000. That is, when static electricity is not applied to the display device 2000, the central processing unit 1000 outputs the input image signals R, G, and B and the control signals as described above.

When static electricity is applied to the display device 2000, a display operation of the display device 2000, however, is not appropriately performed. In this case, the central processing unit 1000 initializes the display operation of the display device 2000 based on the signal transmitted from the feedback unit 3000 so as to appropriately drive the display device 2000, which will be described with reference to FIG. 4 and FIG. 5.

As shown in FIG. 5, the feedback unit 3000 of the electronic device according to an exemplary embodiment of the present invention includes a first terminal E1 and a second terminal E2.

The first terminal E1 is connected to the display device 2000. In further detail, the first terminal E1 is connected to the driving voltage generator 710 of the driving chip 700 through the flexible printed circuit board 650 of the display device 2000. The first terminal E1 receives one of the driving voltages from the driving voltage generator 710, and a second voltage VGH that is equal to the gate-on voltage Von that is applied to the first terminal E1.

The second terminal E2 is connected to the central processing unit 1000.

The feedback unit 3000 includes a transistor TR, first and second resistors R1 and R2 coupled in series, and a third resistor R3 coupled to the transistor TR.

The first resistor R1 is connected between the first terminal E1 and a first node n1, and the second resistor R2 is connected between a first node n1 and a ground voltage. A ratio of resistance of the respective first and second resistors R1 and R2 is 6:1. For example, the resistance of the first resistor R1 may be 180KΩ, and that of the second resistor R2 may be 30KΩ.

The transistor TR is an n-type transistor including an input electrode, an output electrode, and a control electrode. The input electrode of the transistor TR is connected to a second node n2, the output electrode is connected to the ground voltage, and the control electrode is connected to the first node n1.

In the present exemplary embodiment of the present invention, while it has been described that the feedback unit 3000 includes the transistor TR, it is not limited thereto, and a switching element corresponding to the transistor TR may be used, for example, an operational amplifier (OP-amp) may be used instead.

The third resistor R3 is connected between a reference power source Vp and the second node n2. The third resistor R3 protects the transistor TR, and thus may be omitted.

Operations of the central processing unit 1000, the display device 2000, and the feedback unit 3000 according to the present exemplary embodiment of the present invention will now be described.

When static electricity is applied to the display device 2000, the driving voltage may not be appropriately boosted in the driving voltage generator 710, and therefore a desired driving voltage may not be generated. That is, the potential of each driving voltage may not be maintained at a required level, and a lower driving voltage may be output.

The second voltage VGH that is one of the driving voltages is also not appropriately boosted, and it is input to the first terminal E1 with a level that is lower than a reference value. The second voltage VGH input to the first terminal E1 is divided according to the resistance of the first resistor R1 and the second resistor R2, so as to determine a voltage of the first node n1 and a voltage of the control electrode of the transistor TR.

When a voltage value of the first node n1 is lower than a threshold voltage of the transistor TR, the transistor TR is maintained to be turned off. Accordingly, the voltage at the second node n2 is obtained by reducing the reference voltage Vp by the third resistor R3, and the voltage at the second node n2 is applied to the second terminal E2. A level of a signal applied to the second terminal E2 is referred to as a first level.

When the level of the signal applied to the second terminal E2 is the first level, the central processing unit 1000 detects that static electricity is applied to the display device 2000 and an error of the display operation occurs. Then, the central processing unit 1000 initializes a driving condition of the display device 2000 so as to appropriately generate the driving voltage. Subsequently, when the display operation of the display device 2000 is performed again, the display operation error caused by the static electricity is not detected, or a time for detecting the display operation error is reduced, and a proper display is provided.

When static electricity is not applied to the display device 2000, the appropriately boosted second voltage VGH is applied to the first terminal E1 from the driving voltage generator 710. Accordingly, as described above, the second voltage VGH is divided by the resistances of the first and second resistors R1 and R2 to determine the voltage of the first node n1 and the control electrode of the transistor TR.

Because the second voltage VGH is appropriately boosted, the voltage at the control electrode of the transistor TR is higher than a threshold voltage of the transistor TR. Thereby, the transistor TR is turned on, and the voltage of the second node n2 becomes equal to the ground voltage. Accordingly, a signal having a level that is equal to the ground voltage is applied to the second terminal E2, which is referred to as a second level. The second level is lower than the first level.

Then, the central processing unit 1000 detects that static electricity is not applied to the display device 2000, and the input image signals R, G, and B and the control signals are applied to the display device 2000 to maintain a normal display state.

That is, according to whether the level of the signal applied from the feedback unit 3000 to the central processing unit 1000 is the first level or the second level, the central processing unit 1000 determines whether the static electricity is applied to the display device 2000 and controls the display device 2000 so as not to perform the display operation error.

Various exemplary embodiments with reference to another driving signal that can be influenced by static electricity will now be described.

Figure 6:
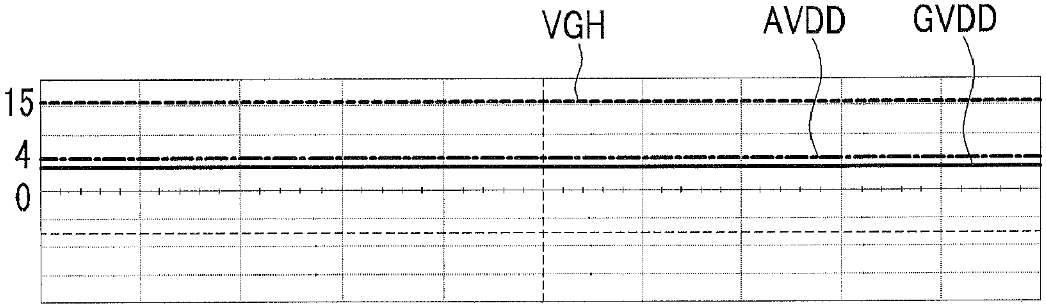
FIG. 6 is a graph of a driving voltage in the normal state in an electronic device according to an exemplary embodiment of the present invention.
Figure 7:
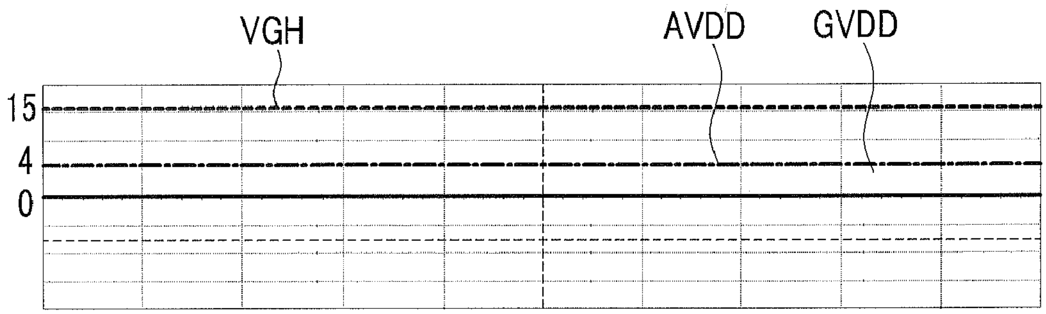
FIG. 7 is a graph of a driving voltage when influenced by static electricity in an electronic device of FIG. 6.

FIG. 6 and FIG. 7 show changes of a driving voltage caused by static electricity in an electronic device including a display device.

FIG. 6 is a graph of a driving voltage in the normal state in an electronic device according to an exemplary embodiment of the present invention, and FIG. 7 is a graph of a driving voltage when influenced by static electricity in the electronic device referred to in FIG. 6. In FIGS. 6 and 7, the horizontal axis represents time and the vertical axis indicates voltage level.

The driving voltages VGH, AVDD, and GVDD in the normal state according to an exemplary embodiment of the present invention have the levels shown in FIG. 6. That is, the voltage VGH has the level of 15V that is the highest among the three voltages, the voltage AVDD has the next level, and the voltage GVDD has the lowest level of 4V. Here, the voltage AVDD has a level that is slightly higher than 4V, and the level difference between the voltage AVDD and the voltage GVDD is not large. When static electricity is applied to the electronic device, the level of the voltage GVDD is reduced to be 0V, as shown in FIG. 7, so that it has a large difference from the level of the voltage AVDD. In this case, because the driving voltage level fails to maintain the required condition, as shown in FIG. 6, the image cannot be displayed normally.

The voltage GVDD influenced by static electricity is required to be fed back so that the central processing unit (CPU) 1000 may sense the same and reset the display device 2000 to normally display the image.

Figure 8:
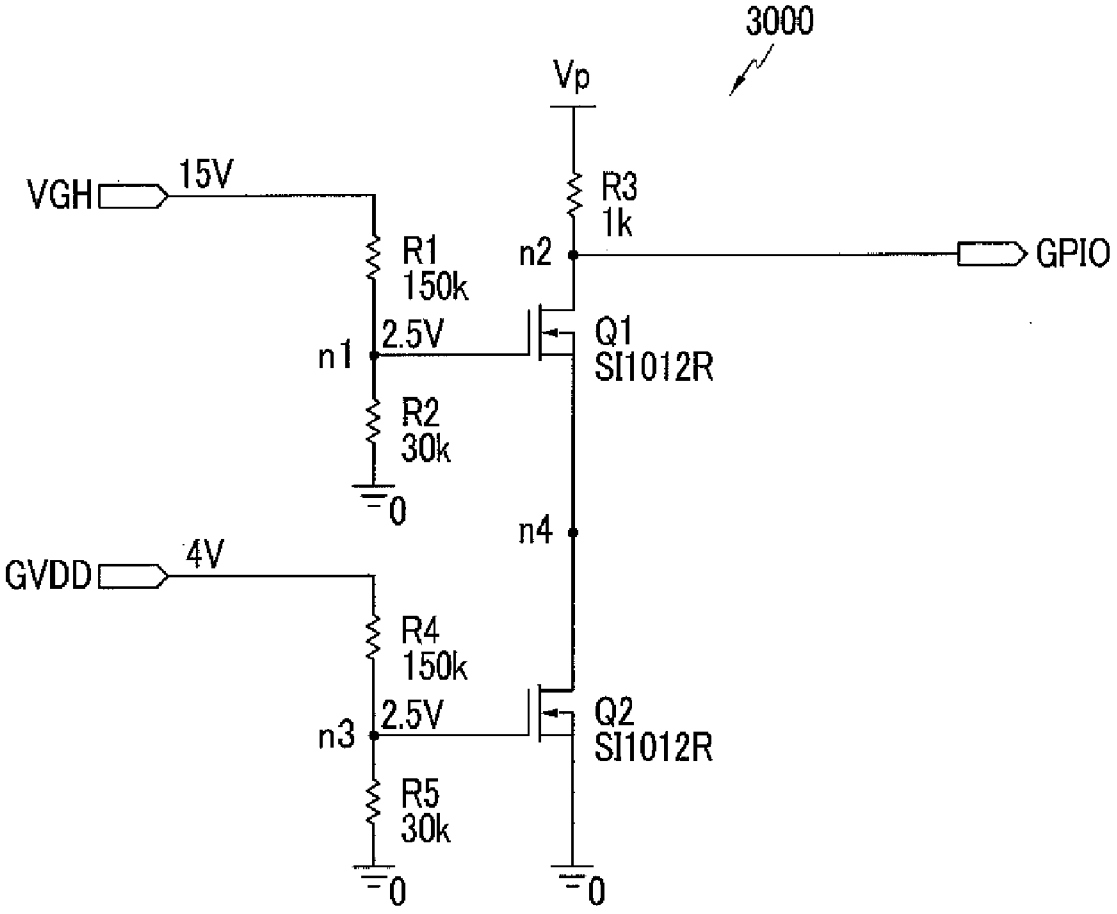
FIG. 8 is a circuit diagram of a feedback unit of an electronic device according to an exemplary embodiment of the present invention.

An exemplary embodiment of the feedback unit 3000 for feeding back the voltage GVDD is shown in FIG. 8.

FIG. 8 shows a circuit diagram of a feedback unit of an electronic device according to an exemplary embodiment of the present invention.

FIG. 8 shows a feedback unit 3000 for feeding back the voltage GVDD according to the voltage VGH that was fed back in the exemplary embodiment of FIG. 5. Here, the voltage VGH represents a gate-on voltage, and the voltage GVDD indicates a reference voltage for generating a gray voltage.

The feedback unit 3000 of the electronic device according to the exemplary embodiment of the present invention shown in FIG. 8 includes a VGH terminal, a GVDD terminal, and a GPIO terminal. The VGH terminal and the GVDD terminal are input terminals and the GPIO terminal is an output terminal.

The VGH terminal and the GVDD terminal are connected to the display device 2000 and, in detail, they are connected to the driving chip 700, specifically, the driving voltage generator 710 of the driving chip 700 through the flexible printed circuit substrate 650 of the display device 2000. The VGH voltage from among the driving voltages applied by the driving voltage generator 710 is applied to the VGH terminal, and the voltage GVDD from among the driving voltages is applied to the GVDD terminal.

Figure 10:
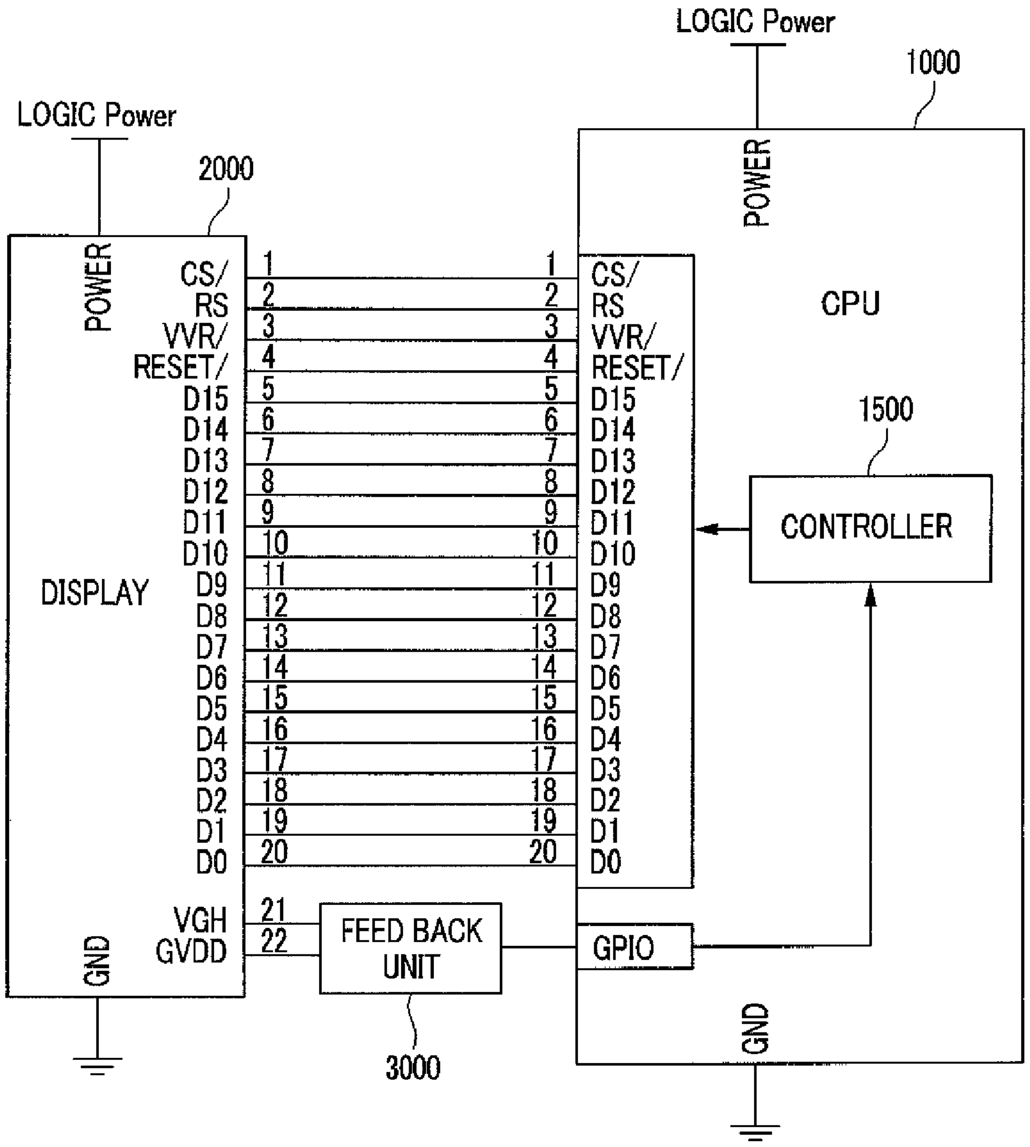
FIG. 10 is a block diagram of an electronic device according to an exemplary embodiment of the present invention.

The GPIO terminal is connected to the CPU 1000, and can be connected to a controller 1500 shown in FIG. 10 in the CPU 1000.

The feedback unit 3000 includes two transistors Q1 and Q2. The transistors Q1 and Q2 respectively have a control terminal, an input terminal, and an output terminal, and the transistors Q1 and Q2 according to the exemplary embodiment of the present invention are n-type transistors. Alternatively, the transistors may be p-type transistors.

The control terminal of the Q1 transistor is connected to a node n1, the input terminal thereof is connected to a node n2, and the output terminal thereof is connected to a node n4. The control terminal of the Q2 transistor is connected to a node n3, the input terminal thereof is connected to the node n4, and the output terminal thereof is grounded.

The control terminals of the transistors Q1 and Q2 are coupled in parallel to two resistors. A control terminal of the Q1 transistor is connected to a connection point between resistors R1 and R2, the resistor R1 is provided between the VGH terminal and the node n1, and the resistor R2 is provided between the node n1 and the ground terminal. The control terminal of the Q2 transistor is connected to a connection point between resistors R4 and R5, the resistor R4 is provided between the GVDD terminal and the node n3, and the resistor R5 is provided between the node n3 and the ground terminal.

The resistances of the respective resistors is shown in FIG. 8, however, the present invention is not restricted to the resistances of the exemplary embodiment. The resistors R1 and R4 have the same resistance and the resistors R2 and R5 have the same resistance to be symmetrical with each other in the exemplary embodiment of FIG. 8, however, the symmetry may not be needed. The resistances of the resistors R1, R2, R4, and R5 can control turning on the transistors Q1 and Q2 when a normal voltage is applied to the VGH terminal and the GVDD terminal, and the resistances thereof can control turning off the transistors Q1 and Q2 when a low voltage is applied, according to the exemplary embodiments. In addition, the transistors Q1 and Q2 can be respectively turned off when the normal voltage is applied, and in this instance, the respective transistors Q1 and Q2 are configured to be turned on when a low voltage is applied.

The resistor R3 is connected to the node n2 of the input terminal of the transistor Q1, and the resistor R3 is connected between the reference voltage Vp and the node n2. The node n2 is also connected to the GPIO terminal. Here, the resistor R3 protects the transistors Q1 and Q2, and thus can be omitted depending on the situation.

In the electronic device referred to in relation to FIG. 6 and FIG. 7, the VGH voltage is 15V and the GVDD voltage is 4V. Here, when influenced by static electricity, the levels of both voltages are not normally boosted and thus can be 0V. Therefore, at least one of the VGH voltage and the GVDD voltage can be 0V.

First, when the VGH voltage is normally applied, a high voltage is applied to the transistor Q1 to be turned on and the nodes n2 and n4 are conductive. Also, when the GVDD voltage is normally applied, a high voltage is applied to the transistor Q2 to be turned on, and the node n4 and the ground terminal are connected. Alternatively, when the low VGH voltage or the GVDD voltage is applied, the conductive transistor Q1 or Q2 is turned off.

When at least one of the transistors Q1 and Q2 is maintained in the turned off state, the voltage applied by the reference voltage Vp reaches the node n2 through the resistor R3 and is then output to the GPIO terminal. This is because a disconnected part (transistor Q1 or Q2) exists between the node n2 and the ground terminal.

When the transistors Q1 and Q2 are maintained in the turned on state, the voltage applied by the reference voltage Vp is connected to the ground terminal passing through the resistor R3, the node n2, and the node n4. In this case, the resistance between the node n2 and the ground terminal is very much less so that the voltage at the node n2 corresponds to the voltage at the ground terminal. Therefore, when the transistors Q1 and Q2 are turned on, the voltage at the node n2 is almost 0V which is very low, and in the other case, that is, when at least one of the two transistors is turned off, the voltage at the node n2 is relatively higher. Therefore, when the low voltage is applied to the GPIO terminal, the VGH voltage and the GVDD voltage are detected to be normal, and when a high voltage is applied to the GPIO terminal, the VGH voltage or the GVDD voltage does not have a normal voltage level, so that a normal display is difficult.

In this case, as shown in FIG. 10, the controller 1500 in the CPU 1000 having received the output value of the GPIO terminal determines to reset the display device 2000 and thereby solve the problem, which can be expressed as in Table 1 hereinbelow.

TABLE 1

| | VGH voltage | GVDD voltage | GPIO voltage |
|---|---|---|---|
| Normal | 15 V (Normal) | 4 V (Normal) | Low voltage |
| Bad | 15 V (Normal) | 0 V (Bad) | High voltage |
| Bad | 0 V (Bad) | 4 V (Normal) | High voltage |
| Bad | 0 V (Bad) | 0 V (Bad) | High voltage |

The feedback unit 3000 of FIG. 8 has been described to have the transistors Q1 and Q2, and without being restricted to this, the same can have other switching elements, such as operational amplifiers (OP-amp). Alternatively, the feedback unit 3000 can be expressed as a simple logic circuit as shown in FIG. 9, and it can be formed by configuring a circuit corresponding to the logic circuit.

Figure 9:
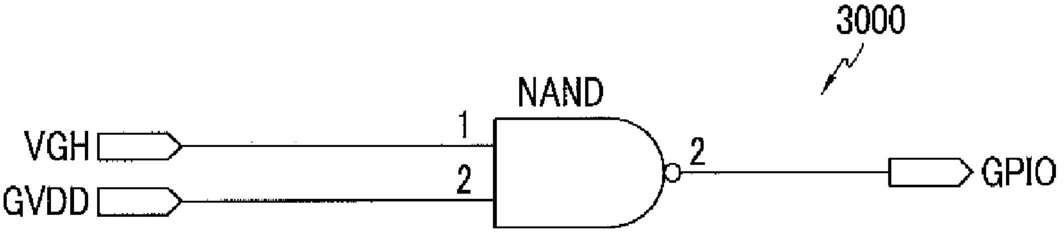
FIG. 9 is a circuit diagram of a feedback unit of an electronic device according to an exemplary embodiment of the present invention.

FIG. 9 shows a circuit diagram, that is, a NAND logic circuit, of a feedback unit 3000 of an electronic device according to an exemplary embodiment of the present invention.

The NAND logic circuit outputs Low when two inputs are High, and it outputs High in all other cases. That is, because High of the input is a normal voltage and the Low of the output is a low voltage, it produces the same result as in Table 1. Therefore, the feedback unit 3000 can be realized through the NAND logic circuit shown in FIG. 9.

A configuration in which the feedback unit 3000 of FIG. 8 and FIG. 9 is connected in an electronic device including a display device will now be described.

FIG. 10 is a block diagram of an electronic device according to an exemplary embodiment of the present invention.

FIG. 10 shows a configuration of connecting a display device 2000 and a CPU 1000 with a plurality of wires. The display device 2000 and the CPU 1000 transmit and receive the driving signal and image signal through these wires. The CPU 1000 applies the driving signal and the image signal to the display device 2000 based on the externally input signal, and the display device 2000 displays the image based on the signals from the CPU 1000. In FIG. 10, voltages such as CS, RS, WR, and RESET are shown as driving signals, and connections D0 to D15 represent image signals. In this instance, the CPU 1000 can further control the display of the image by additionally generating the driving voltages such as VGH and GVDD based on the input driving signal. In this instance, the CPU 1000 receives the state information on whether the VGH voltage and the GVDD voltage generated by the display device 2000 are greater than a predetermined level through the feedback unit 3000, and the display device 2000 is controlled by the controller 1500 in the CPU 1000. That is, when the output of the feedback unit 3000 is a High voltage, the controller 1500 outputs a RESET signal to reset the display device 2000 and thereby change the VGH or GVDD voltage to be a normal voltage.

The exemplary embodiment in which one of the driving voltages fails to indicate the normal level has been described in regard to FIG. 4 and FIG. 5, and the exemplary embodiment in which two voltages fail to represent the normal level has been described in regard to FIG. 8 to FIG. 10.

Because the real driving voltage can be plural and different driving voltages can be used for the respective exemplary embodiments, the present invention is not restricted to one or two driving voltages, and it may not be restricted to the above-described VGH voltage and GVDD voltage.

Therefore, it may be required to check three or more driving voltages and feed them back depending on the particular exemplary embodiments.

Figure 11:
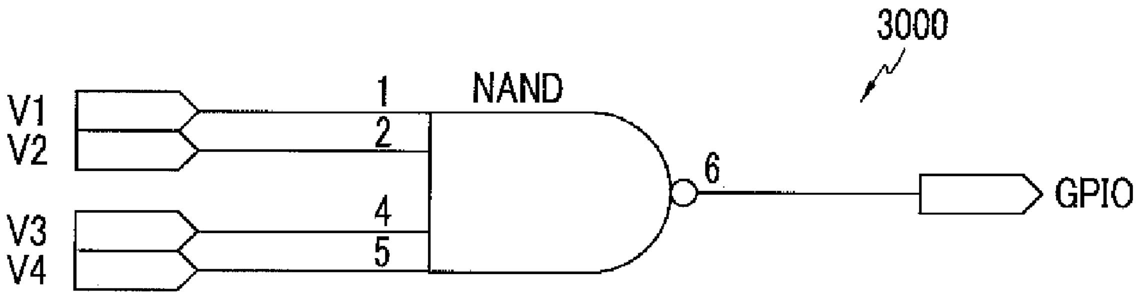
FIG. 11 is a circuit diagram of a feedback unit of an electronic device according to an exemplary embodiment of the present invention.

FIG. 11 shows an exemplary embodiment of the feedback unit 3000 with three or more input terminals, and in more detail, FIG. 11 shows the exemplary embodiment of four input terminals.

FIG. 11 shows a circuit diagram of a feedback unit 3000 of an electronic device according to an exemplary embodiment of the present invention.

As shown in FIG. 11, a NAND circuit with four inputs is configured, and when all the inputs are High, a Low level voltage is output, and in all other cases, the controller 1500 outputs the reset signal. Also, the voltages input to the input terminal are variable depending on the exemplary embodiments, and hence they are shown as V1, V2, V3, and V4.

FIG. 8 to FIG. 11 show exemplary embodiments of the normal case in which the output is Low, however, the present invention is not restricted to this. Furthermore, the input voltage has the High voltage in the normal case, however, the present invention is not restricted to this.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

According to the exemplary embodiment of the present invention, when static electricity is applied to a display device, the static electricity is detected and the display device is controlled to maintain the normal display state so that static electricity damage or display malfunction will not occur.

What is claimed is:

1. An electronic device comprising:

a central processing unit (CPU) for providing image data and an input control signal;

a display device including a driving voltage generator for generating a plurality of driving signals and displaying an image based on the image data and the input control signal;

a connecting wire for transmitting the image data and the input control signal from the CPU to the display device; and a feedback unit connected between the CPU and the display device and feeding the driving signal of the display device back to the CPU, wherein the display device is reset by the CPU based on an output of the feedback unit, and the feedback unit is connected to the display device through at least one input wire receiving a driving signal of the plurality of driving signals from the driving voltage generator and not via a driver.

2. The electronic device of claim 1, wherein the feedback unit is connected to the CPU though a wire other than the connecting wire, and the at least one input wire is different from the connecting wire.

3. The electronic device of claim 2, wherein the feedback unit is connected to the display device through a plurality of input wires respectively receiving different driving signals of the plurality of driving signals, and the feedback unit is connected to the CPU through an output wire.

4. The electronic device of claim 3, wherein the feedback unit includes a transistor and two resistors connected to one of the plurality of input wires, and a control terminal of the transistor is connected to a connection point of the two resistors.

5. The electronic device of claim 4, wherein the two resistors included in the feedback unit are connected in series between a reference voltage and a ground terminal.

6. The electronic device of claim 5, wherein the output wire is connected to a node between the reference voltage and an input terminal of the transistor.

7. The electronic device of claim 5, further including a third resistor connected between the reference voltage and an input terminal of the transistor.

8. The electronic device of claim 4, wherein the transistor is an n-type transistor.

9. The electronic device of claim 4, wherein the feedback unit outputs a low voltage when each of the different driving signals is normal, and the feedback unit outputs a high voltage when at least one of the different driving signals is not normal.

10. The electronic device of claim 3, wherein the feedback unit is a NAND circuit.

11. The electronic device of claim 10, wherein the feedback unit outputs a low voltage when each of the different driving signals is normal, and the feedback unit outputs a high voltage when at least one of the different driving signals is not normal.

12. The electronic device of claim 3, wherein at least one of the driving signals fed back through the plurality of input wires includes a reference voltage GVDD of a gray voltage.

13. The electronic device of claim 1, wherein the input control signal transmitted to the display device from the CPU through the connecting wire includes a reset signal.

14. A method for driving an electronic device including a central processing unit (CPU) for providing image data and an input control signal and a display device for displaying an image based on the image data and the input control signal, the method comprising:

receiving a driving signal of the display device and determining whether the driving signal of the display device has a predetermined normal level, wherein the driving signal of the display device is input to a feedback unit through at least one input wire receiving the driving signal from a driving voltage generator and not via a driver;

controlling the display device to perform a display operation when the driving signal has the predetermined normal level;

controlling the CPU to reset the display device when the driving signal does not have the predetermined normal level; and performing the display operation upon resetting a drive condition of the display device.

15. The method of claim 14, wherein, in the receiving of a driving signal of the display device and determining whether the driving signal of the display device has a predetermined normal level, the number of driving signals is plural.

16. The method of claim 14, wherein the driving signal includes a reference voltage of a gray voltage.

17. The method of claim 14, wherein the determining is based on an output of the feedback unit.

18. The method of claim 17, wherein, when the feedback unit outputs a low voltage, the driving signal is determined to be the predetermined normal level, and when the feedback unit outputs a high voltage, the driving signal is determined to not be the predetermined normal level.

* * * * *